April 13, 1926.
P. D. HARVEY
SELF CLOSING FLUID VALVE
Filed Feb. 8, 1924
1,580,828
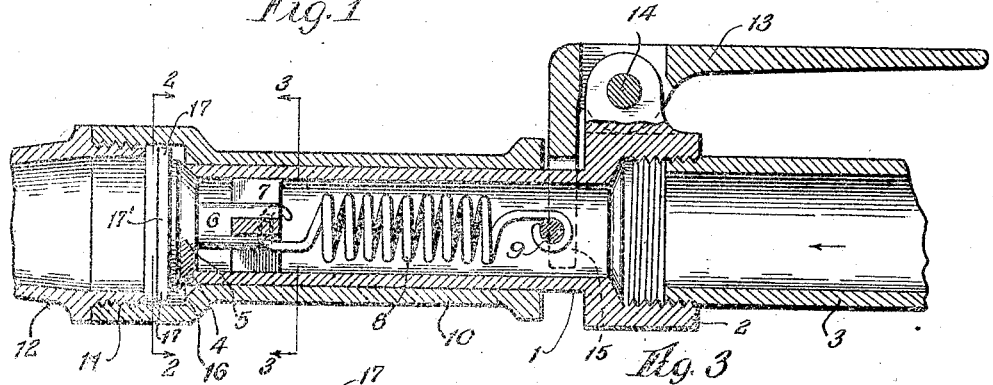
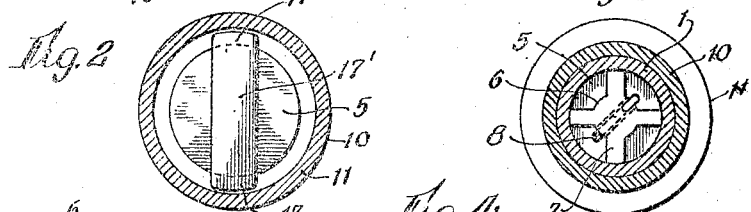
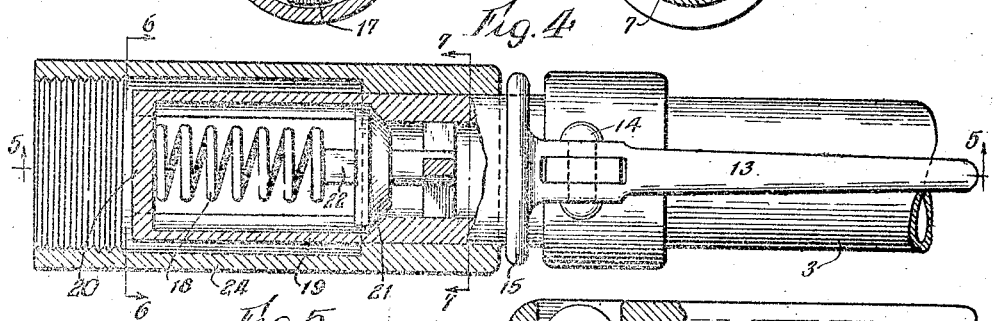
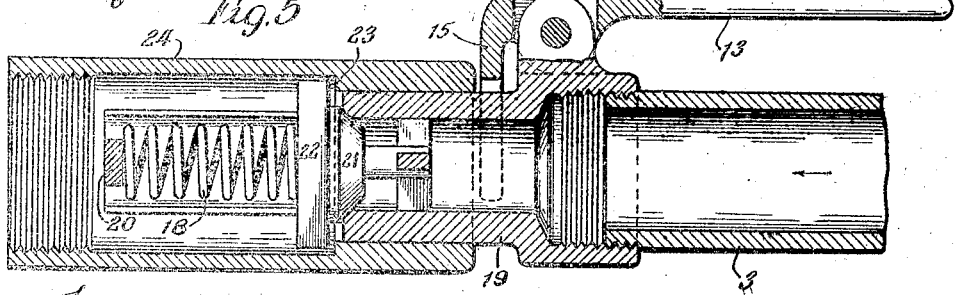
Inventor:
Paul D. Harvey
By: Wm. O. Belt, Atty.

Patented Apr. 13, 1926.

1,580,828

UNITED STATES PATENT OFFICE.

PAUL D. HARVEY, OF CHICAGO, ILLINOIS.

SELF-CLOSING FLUID VALVE.

Application filed February 8, 1924. Serial No. 691,330.

*To all whom it may concern:*

Be it known that I, PAUL D. HARVEY, a citizen of the United States, residing at Chicago, in the county of Cook and State of Illinois, have invented certain new and useful Improvements in Self-Closing Fluid Valves, of which the following is a specification.

The object of this invention is to provide an automatic valve which can be used for many purposes and particularly where a large volume of water is desired for various uses such, for example, as washing automobiles.

Another object of the invention is to provide a valve of simple construction which can be easily opened to permit a flow of water in large volume and which will automatically close when the opening lever is released to effectually shut off the flow of water.

My invention also has for its object to provide a valve of simple construction, free from delicate parts, and which does not easily get out of order, which requires no packing but which will always close in an efficient manner without leakage.

In the accompanying drawings I have shown several embodiments of the invention and referring thereto:—

Fig. 1 is a longitudinal sectional view showing one form of the invention.

Figs. 2 and 3 are transverse sectional views on the lines 2—2 and 3—3 of Fig. 1.

Fig. 4 is a longitudinal sectional view of another form of the invention.

Figs. 5, 6 and 7 are sectional views on the lines 5—5, 6—6, and 7—7 respectively of Fig. 4.

Referring first to Figs. 1—3, the invention comprises a tubular body 1 provided at one end with a socket 2 to receive a hose 3 or other supply conduit, and at its other end with a seat 4 for the valve 5 which is mounted on a stem 6 having a spider 7 operating in the body 1 and constituting a guide for properly registering the valve 5 with its seat 4. A tension spring 8 is engaged at one end with the valve stem 6 and at its other end with a cross-bar 9 in the body and this spring tends to normally hold the valve on its seat. A sliding sleeve 10 is mounted on the body 1 and is provided at its outer end with a socket 11 to receive a nozzle 12. A handle lever 13 is pivotally mounted at 14 on the tubular body 1 and it has a fork 15 which is arranged between the socket end 2 of the body and the adjacent end of the sliding sleeve whereby the socket end of the body forms a stop for the forked end of the lever and limits the outward movement of the handle thereof. Depressing the handle lever throws the fork 15 forward and slides the sleeve 10 on the body 1 until the shoulder 16 on the sleeve engages the projections 17 on the valve and, overcoming the tension of the spring, moves the valve outward away from its seat. The valve will remain open while the lever is depressed, but immediately after pressure on the lever is released, the spring will return the valve to its seat and completely shut off the flow of water through the valve. I have shown two projections 17 provided by a cross-bar 17′ on the outer face of the valve, but these projections may be made integral with the valve 5 and any number of them may be provided which will effect a proper unseating of the valve when engaged by the sleeve.

In Figs. 4 to 7, a compression spring 18 is held in place in the body 19 between the cross-bar 20 at the outer end thereof and the valve 21. This valve has projections on the back thereof extending through the body into the path of shoulders 23 on the sliding sleeve 24, and these projections are conveniently provided by the ends of a cross-bar 22 rigid with the valve. The body is of skeleton form between the valve and its outer end, as will be readily observed in Fig. 6. In this embodiment pressure applied to the handle 13 causes the fork 15 to slide the sleeve 24 outward on the body 19, the shoulders 23 engage the projections on the valve, compress the spring, and the valve is unseated to permit a flow of water therethrough. When pressure on the handle is released, the spring immediately reseats the valve and shuts off the flow of water.

In the forms of my invention illustrated, the lever is shown conveniently located at the top of the device for thrusting the sleeve outward; but any one of the forms will operate satisfactorily regardless of the position of the handle lever and this is a very desirable feature of the invention because of the uses to which it has been and may be put. I have found the invention very satisfactory in use on a hose supplying water for washing automobiles in a large garage where a large volume of water is desired and instant control of the flow of water is necessary to produce efficient results and to prevent waste. The valve is adapted to be easily operated and this is also a matter of considerable importance, because the men who wash automobiles, for example, are not highly skilled or particularly careful in their work and could not be relied upon to operate a valve which required skillful attention. My improved valve is designed more particularly for what I may call "rough work" and for that purpose it is strong and substantial, easily operated, and efficient in its work. I have referred to the invention as a water valve and to its use in a water line for washing automobiles, but this is for purposes of description and is not intended to limit the invention since it will be apparent that it can be used for other purposes with satisfactory results.

To adapt the valve for different classes of work, it may be desirable to change the form and proportion of parts and construction of the details from those shown in the drawings, and I consider myself entitled to make all such changes as fairly fall within the scope of the following claims:—

I claim:—

1. A self closing valve comprising a tubular body, a valve seat on the body, a valve arranged to engage said seat, a sleeve slidable on the body and adapted to engage and unseat said valve, a spring within the body for normally seating the valve, and a handle lever pivoted to said body and engaging said sleeve to slide the same, the handle of said lever lying substantially parallel to said body.

2. A self closing valve comprising a tubular body, a valve seat on the body, a valve arranged to engage said seat, a sleeve slidable on the body and adapted to engage and unseat said valve, means within the body for normally seating the valve, and a handle lever pivoted to said body and engaging said sleeve to slide the same, the handle of said lever lying substantially parallel to said body.

3. A self closing valve comprising a tubular body terminating in a valve seat, a valve arranged to engage said seat and normally held in engagement therewith, a sleeve slidably mounted on said body and extending beyond said seat, said sleeve provided with means to engage said valve and unseat the same, and a handle lever pivoted on said body and adapted to engage said sleeve to slide the same on said body.

PAUL D. HARVEY.